United States Patent
Pinpin et al.

(10) Patent No.: US 10,248,812 B2
(45) Date of Patent: Apr. 2, 2019

(54) USER PERSONALIZATION OF THIRD-PARTY WEBPAGE IMAGES

(71) Applicant: Microsoft Technology Licensing, LLC, Redmond, WA (US)

(72) Inventors: Maria Bernadette G. Pinpin, Bellevue, WA (US); Wallace Earl Greathouse, Kirkland, WA (US); Jason J. Wall, Redmond, WA (US); Kris L. Kendall, Seattle, WA (US); Dan Li, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 15/075,951

(22) Filed: Mar. 21, 2016

(65) Prior Publication Data
US 2017/0269819 A1 Sep. 21, 2017

(51) Int. Cl.
G06F 17/30 (2006.01)
G06F 21/62 (2013.01)
H04L 29/08 (2006.01)

(52) U.S. Cl.
CPC ........ G06F 21/629 (2013.01); G06F 17/3089 (2013.01); H04L 67/02 (2013.01); H04L 67/20 (2013.01); G06T 2200/24 (2013.01)

(58) Field of Classification Search
CPC combination set(s) only.
See application file for complete search history.

(56) References Cited

U.S. PATENT DOCUMENTS

| 7,908,150 | B2 | 3/2011 | Rochet |
| 8,065,391 | B2 | 11/2011 | Olliphant |
| 8,355,955 | B1 | 1/2013 | Mirchandani et al. |
| 8,364,755 | B2 * | 1/2013 | Olson .................. G06Q 10/10 709/203 |
| 8,566,712 | B1 | 10/2013 | Varian |
| 2008/0201206 | A1 | 8/2008 | Pokorney et al. |
| 2009/0043813 | A1 * | 2/2009 | Moore .............. G06F 17/30876 |

(Continued)

FOREIGN PATENT DOCUMENTS

AE  WO2014049404 A1  4/2014

OTHER PUBLICATIONS

Mishra, "Personalize Google Search Homepage with Background Image and No Logo using Chrome Extension", Mar. 22, 2013, pp. 3, Internet Techies—A WebFanzine Media Company, retrieved at <<http://www.clickonf5.org/15034/personalize-google-homepage-background-image-no-logo/>>.

*Primary Examiner* — Hien L Duong
(74) *Attorney, Agent, or Firm* — Alleman Hall Creasman & Tuttle LLP

(57) ABSTRACT

An authorized user is allowed to personalize an existing third-party webpage. A request is received from the authorized user to insert a user-selected image into the third-party webpage. It is then determined if the user-selected image is appropriate for use on the third-party webpage, where this determination is based on one or more image appropriateness criteria. Whenever the user-selected image is determined to be appropriate for use on the third-party webpage, the third-party webpage is personalized by inserting the user-selected image into the third-party webpage according to the authorized user's image insertion request.

20 Claims, 4 Drawing Sheets

(56) References Cited

U.S. PATENT DOCUMENTS

| | | | |
|---|---|---|---|
| 2010/0223664 A1* | 9/2010 | Naranjo | G06F 3/048 |
| | | | 726/10 |
| 2011/0264736 A1* | 10/2011 | Zuckerberg | G06Q 30/02 |
| | | | 709/204 |
| 2011/0314419 A1 | 12/2011 | Dunn et al. | |
| 2012/0023081 A1 | 1/2012 | Nayak et al. | |
| 2012/0084731 A1 | 4/2012 | Filman et al. | |
| 2013/0080911 A1 | 3/2013 | Klemm | |
| 2013/0211970 A1* | 8/2013 | Glass | G06Q 30/0641 |
| | | | 705/27.1 |
| 2013/0290827 A1 | 10/2013 | Smith et al. | |
| 2013/0290862 A1* | 10/2013 | Chand | G06F 17/30867 |
| | | | 715/745 |
| 2013/0325671 A1* | 12/2013 | Glass | G06Q 30/0641 |
| | | | 705/27.1 |
| 2013/0326345 A1* | 12/2013 | Haggart | G06F 17/24 |
| | | | 715/255 |
| 2014/0120511 A1* | 5/2014 | Hall | G09B 5/14 |
| | | | 434/350 |
| 2014/0279068 A1* | 9/2014 | Systrom | G06Q 30/0277 |
| | | | 705/14.73 |
| 2014/0282115 A1* | 9/2014 | Balogh | G06F 17/30902 |
| | | | 715/760 |
| 2014/0282140 A1* | 9/2014 | Balogh | G06F 17/2247 |
| | | | 715/765 |
| 2015/0106225 A1* | 4/2015 | Glass | G06Q 20/12 |
| | | | 705/26.7 |
| 2015/0113448 A1* | 4/2015 | Underwood | G06Q 30/0641 |
| | | | 715/760 |
| 2015/0302886 A1* | 10/2015 | Brock | G06F 21/10 |
| | | | 726/32 |
| 2016/0267126 A1* | 9/2016 | Olson | G06Q 10/10 |
| 2016/0315983 A1* | 10/2016 | Lewis | G11B 27/02 |

* cited by examiner

USER PERSONALIZATION OF THIRD-PARTY WEBPAGE IMAGES

BACKGROUND

The Internet is a global data communications system that serves billions of users worldwide. The Internet provides users across the globe access to a vast array of online information resources and services, including those provided by the World Wide Web (hereafter simply referred to as the Web), intranet-based enterprises, and the like. As is appreciated in the art of the Web, the Web is organized as a collection of websites each of which is organized as a set of webpages (also known as web pages). Each of the webpages on the Web operates as a user-accessible online document that can be accessed via a Uniform Resource Locator (URL) (also known as a web address) that uniquely identifies the webpage. A given webpage may include a wide variety of different types of online information content such as text, images, graphics, animations, audio and video. A given webpage may also include hyperlinks to other webpages and/or documents on the Web. The Web currently hosts billions of webpages which collectively host a massive and ever-growing amount of information content covering any subject a user might be interested in. For example, the webpages on the Web collectively currently host approximately one trillion images and this number continues to grow at a rapid pace.

As is also appreciated in the art of the Web, users may have to create an account on a given website and login (e.g., sign in) to this account in order to access certain of the website's information content and/or features/functionality. The homepage (also known as a home page, or front page, or landing page) of a given website is the first webpage of the website that a user sees when they navigate to the website using a web search engine. A website's homepage serves a variety of purposes. For example, a website's homepage facilitates user navigation to other webpages on the website that provide the website's underlying information content. Many different web search engines exist today which run on a wide variety of network-enabled client computing devices and provide the users of these devices with the ability to easily search for desired online information either on a specific computing device, or on a network such as the Internet or a private network. Thanks to the ubiquity of the Internet and the various types of network-enabled client computing devices that exist today, users across the globe routinely use one or more web search engines to search for, retrieve and view any type of information content covering any subject they are interested in.

SUMMARY

Webpage image personalization technique implementations described herein generally allow an authorized user to personalize an existing third-party webpage. In one exemplary implementation a request is received from the authorized user to insert a user-selected image into the third-party webpage. It is then determined if the user-selected image is appropriate for use on the third-party webpage, where this determination is based on one or more image appropriateness criteria. Whenever the user-selected image is determined to be appropriate for use on the third-party webpage, the third-party webpage is personalized by inserting the user-selected image into the third-party webpage according to the authorized user's image insertion request.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the webpage image personalization technique implementations described herein will become better understood with regard to the following description, appended claims, and accompanying drawings where:

DETAILED DESCRIPTION

Figure 1:
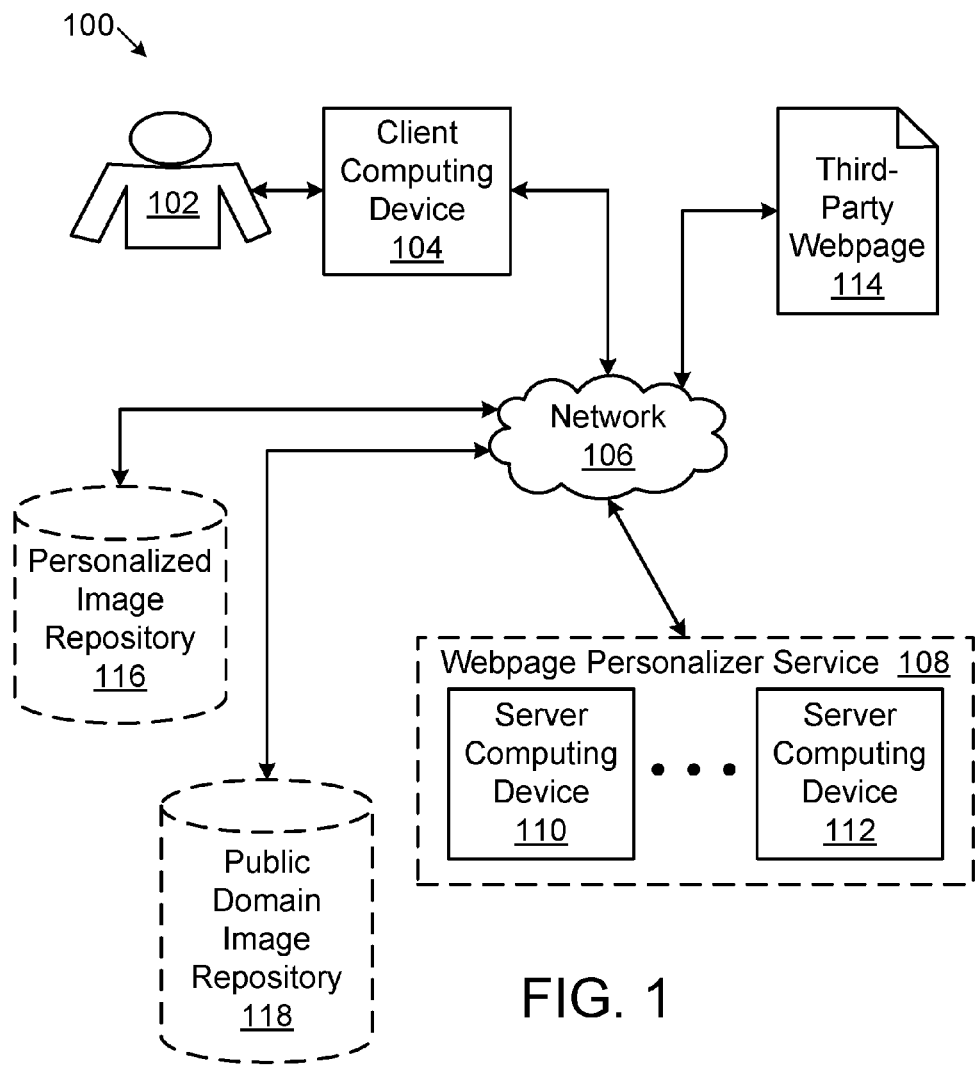
FIG. 1 is a diagram illustrating an exemplary implementation, in simplified form, of a system framework for realizing the webpage image personalization technique implementations described herein.

In the following description of webpage image personalization technique implementations reference is made to the accompanying drawings which form a part hereof, and in which are shown, by way of illustration, specific implementations in which the webpage image personalization technique can be practiced. It is understood that other implementations can be utilized and structural changes can be made without departing from the scope of the webpage image personalization technique implementations.

It is also noted that for the sake of clarity specific terminology will be resorted to in describing the webpage image personalization technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the webpage image personalization technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the webpage image personalization technique does not inherently indicate any particular order nor imply any limitations of the webpage image personalization technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 User Personalization of Third-Party Webpage Images

The webpage image personalization technique implementations described herein generally provide an authorized user with the ability to personalize (e.g., customize) an existing third-party webpage. The term "authorized user" is used herein to refer to a user who has authorization (e.g., permission/approval) to personalize the third-party webpage. Exemplary methods for performing this authorization are described in more detail hereafter.

The webpage image personalization technique implementations described herein are advantageous for various reasons including, but not limited to, the following. As will be appreciated from the more-detailed description that follows, the webpage image personalization technique implementations can be used to personalize any type of existing third-party webpage. By way of example but not limitation, in a tested implementation of the webpage image personalization technique described herein this technique was used to personalize the homepage of a conventional web search engine, namely BING® (a registered trademark of Microsoft Corporation—available at https://www.bing.com/). It is noted that the webpage image personalization technique can also be used to personalize the homepage of any other conventional web search engine such as GOOGLE™ (a trademark of Google, Inc.) Search (available at https://www.google.com/), YAHOO!® (a registered trademark of Yahoo! Inc.) Search (available at http://search.yahoo.com/), and DUCK DUCK GO® (a registered service mark of DuckDuckGo, Inc.—available at https://duckduckgo.com/), among others.

As will also be appreciated from the more-detailed description that follows, the webpage image personalization technique implementations can be used to promote an existing third-party website and its associated webpages in a fun and engaging manner that will draw new users to the website and entice them to access the website's information content and features/functionality. Accordingly, the webpage image personalization technique implementations can be used to increase awareness and usage of an existing third-party website and its associated webpages. The webpage image personalization technique implementations can also be used to prevent the use of copyrighted images and other types of inappropriate images on a third-party webpage, thus preventing the undesirable consequences associated with such copyrighted/inappropriate images usage.

FIG. 1 illustrates an exemplary implementation, in simplified form, of a system framework for realizing the webpage image personalization technique implementations described herein. As exemplified in FIG. 1, the system framework 100 includes a client computing device 104 that is utilized by an authorized user 102 to personalize an existing third-party webpage 114 that can be accessed via a conventional data communication network 106 such as the Internet (among other types of conventional networks). In an exemplary implementation of the webpage image personalization technique described herein the client computing device 104 can be any type of conventional mobile computing device such as a smartphone, or a tablet computer, or a laptop computer (sometimes also referred to as a notebook or netbook computer), among other types of conventional mobile computing devices. The client computing device 104 can also be any type of conventional non-mobile computing device such as a desktop personal computer (PC), or a video game console, among other types of conventional non-mobile computing devices.

Referring again to FIG. 1, the client computing device 104 is configured to communicate over the data communication network 106 with a webpage personalizer service 108 that operates (e.g., runs) on one or more server computing devices 110/112. These server computing devices 110/112 can also communicate with each other via the network 106. In an exemplary implementation of the webpage image personalization technique described herein the server computing devices 110/112 are located in the cloud so that the webpage personalizer service 108 operates as a cloud service and the network 106 includes wide area network functionality. The term "cloud service" is used herein to refer to a Web application that operates in the cloud and can be hosted on (e.g., deployed at) a plurality of data centers that can be located in different geographic regions (e.g., different regions of the world).

Referring again to FIG. 1, the system framework 100 may also include a personalized image repository 116 that can also be accessed via the data communication network 106. In an exemplary implementation of the webpage image personalization technique described herein the personalized image repository 116 includes a collection (e.g., a database) of personalized images that is contributed to by either the authorized user 102, or one or more other users, or a combination thereof. By way of example but not limitation and as will be described in more detail hereafter, the user 102 or other users can upload various types of personalized images to the personalized image repository 116. The webpage personalizer service 108 generally provides various types of functionality associated with the personalization of the existing third-party webpage 114. By way of example but not limitation, the user 102 can select an image from the personalized image repository 116 and submit a request to the webpage personalizer service 108 to insert this user-selected image into the webpage 114. The webpage personalizer service 108 then determines if the user-selected image is appropriate for use on the webpage 114 and if so, the webpage personalizer service 108 personalizes the webpage 114 by retrieving (e.g., downloading) the user-selected image from the personalized image repository 116 and inserting it into the webpage 114 according to the user's 102 image insertion request.

Referring again to FIG. 1, the system framework 100 may also include a public domain image repository 118 that can also be accessed via the data communication network 106. In an exemplary implementation of the webpage image personalization technique described herein the public domain image repository 118 includes a collection of images that is certified as being in the public domain. As is appreciated in the art of original creative works copyrighting, creative works (e.g, images, movies, videos, music, books, video games, and computer programs, among other types of creative works) in the public domain are those works whose exclusive intellectual property rights (e.g., copyrights) have expired, or have been forfeited, or are inapplicable. Accordingly, images in the public domain image repository 118 are certified to be uncopyrighted and thus can be freely used and shared by any user. Thus, in the case where the authorized user 102 selects an image from the public domain image repository 118 and submits a request to the webpage personalizer service 108 to insert this user-selected image into the webpage 114, the webpage personalizer service 108 will personalize the webpage 114 by retrieving the user-selected image from the public domain image repository 118 and inserting it into the webpage 114 according to the user's 102 image insertion request.

Figure 2:
FIG. 2 is a flow diagram illustrating an exemplary implementation, in simplified form, of a process for allowing an authorized user to personalize an existing third-party webpage.

FIG. 2 illustrates an exemplary implementation, in simplified form, of a process for allowing an authorized user to personalize an existing third-party webpage. In an exemplary implementation of the webpage image personalization technique described herein the process illustrated in FIG. 2 is realized on the system framework 100 illustrated in FIG. 1, and assumes that the user 102 is authorized to personalize the existing third-party webpage 114. This user authorization can be realized in various ways. For example, in one version of the webpage image personalization technique the user 102 can submit a request to the webpage personalizer service 108 to login to an account the user created on the webpage 114 (e.g., the user 102 can submit the username and password that are associated with their account on the webpage 114 to the webpage personalizer service 108. The webpage personalizer service 108 can then validate this user login request and also validate that the user is authorized to personalize the webpage 114. In another version of the webpage image personalization technique the user authorization can be performed by a cloud service other than the webpage personalizer service 108.

The process exemplified in FIG. 2 starts with receiving a request from the authorized user to insert a user-selected image into the existing third-party webpage (process action 200). It is noted that the user-selected image can be any type of image. By way of example but not limitation, in one implementation of the webpage image personalization technique described herein the user-selected image is a photograph of either the authorized user, or one or more other users, or a combination thereof. In another implementation of the webpage image personalization technique the user-selected image is a photograph that was taken by the authorized user or another user. In yet another implementation of the webpage image personalization technique the user-selected image is a public image that the authorized user or another user downloaded from a website. In yet another implementation of the webpage image personalization technique the user-selected image is a graphical image that was generated by the authorized user or another user.

Referring again to FIG. 2, after the authorized user's request to insert a user-selected image into the existing third-party webpage has been received (action 200), it is determined if the user-selected image is appropriate for use on the third-party webpage, where this determination is based on one or more image appropriateness (e.g., suitability) criteria (process action 206). It is noted that the webpage image personalization technique implementations described herein support any type of image appropriateness criterion. By way of example but not limitation, in one implementation of the webpage image personalization technique described herein the image appropriateness criteria include the user-selected image being uncopyrighted—this particular implementation is hereafter simply referred to as the copyright determination implementation. The determination of whether or not the user-selected image is copyrighted can be made in various ways. By way of example but not limitation, in one version of the copyright determination implementation the determination of whether or not the user-selected image is copyrighted can be made by analyzing the user-selected image to determine if it includes either a notice of copyright, or information indicating that the user-selected image cannot be used without the consent of its owner, or a combination thereof. As is appreciated in the art of digital images, the just-described notice and image usage information can be incorporated into the user-selected image in various ways such as a visible watermark that is overlaid on top of the user-selected image, among other ways. As is appreciated in the art of original creative works copyrighting, a notice of copyright for the user-selected image would generally include the copyright symbol© (or the word "Copyright", or its abbreviation "Copr."), the year when the user-selected image was first published, and information identifying the owner of the copyright. In another version of the copyright determination implementation where the user-selected image includes metadata, the determination of whether or not the user-selected image is copyrighted can be made by analyzing this metadata to determine if it includes either a notice of copyright, or information indicating that the user-selected image cannot be used without the consent of its owner, or a combination thereof. In yet another version of the copyright determination implementation the determination of whether or not the user-selected image is copyrighted can be made by determining whether or not the user-selected image is contained within the aforementioned public domain image repository.

In another implementation of the webpage image personalization technique described herein the image appropriateness criteria include the user-selected image being sanctioned as being compatible with a branding that is associated with the third-party webpage. For example, in the case where the third-party webpage advertises one or more products or services that are provided by a particular company, the image appropriateness criteria may specify that the user-selected image is not to contain the products, or services, or logo of a company that competes with the particular company. In yet another implementation of the webpage image personalization technique the image appropriateness criteria include the user-selected image having no inappropriate content. As is appreciated in the art of the Web, the appropriateness of the content of the user-selected image is generally based on various factors such as the particular nature and subject matter of the third-party webpage, and the particular types of users and the age range of the users that the third-party webpage is intended for, among other possible factors. As such, inappropriate content may include, but is not limited to, content that is disparaging or "adult" in nature, or content that is profane, or content that encourages or is related to behavior that is deemed to be inappropriate for the users that the third-party webpage is intended for (e.g., content that encourages gambling, violence, vandalism, crime, racism, substance abuse, suicide, or the like). In yet another implementation of the webpage image personalization technique the image appropriateness criteria include the user-selected image not appearing in a list of images that are not to be used on the third-party webpage (e.g., a list of disapproved images).

Referring again to FIG. 2, whenever the user-selected image is determined to be inappropriate for use on the existing third-party webpage, the authorized user can be notified accordingly (process action 208), where this notification may include one or more reasons why the user-selected image was determined to be inappropriate. Whenever the user-selected image is determined to be appropriate for use on the third-party webpage, the third-party webpage is personalized by inserting the user-selected image into the third-party webpage according to the authorized user's image insertion request (process action 210). The authorized user's image insertion request can specify that the user-selected image be inserted into the third-party webpage in various ways. By way of example but not limitation, in one implementation of the webpage image personalization technique described herein the authorized user's image insertion request may specify that a background image of the third-party webpage be changed from a default image to the user-selected image. In this case, the action of inserting the user-selected image into the third-party webpage according to the authorized user's image insertion request (action 210) would involve changing the background image of the third-party webpage to the user-selected image. In another implementation of the webpage image personalization technique the authorized user's image insertion request may specify that the user-selected image be inset into a specific location on the third-party webpage. In this case, the action of inserting the user-selected image into the third-party webpage according to the authorized user's image insertion request (action 210) would involve the user-selected image being inset into the specific location on the third-party webpage.

Referring again to FIG. 2, the action of receiving a request from the authorized user to insert a user-selected image into the existing third-party webpage (action 200) can optionally include the actions of receiving a request from the authorized user to add an image hotspot to a specific location on the user-selected image (action 202), and then overlaying the image hotspot onto the user-selected image in this specific location (action 204). The webpage image personalization technique implementations described herein support the addition of any number of image hotspots to the user-selected image. In a tested implementation of the webpage image personalization technique described herein this number was three.

The authorized user's image hotspot addition request can specify various attributes of the image hotspot in addition to its location on the user-selected image. By way of example but not limitation, the image hotspot addition request may specify a text annotation that provides information about the image hotspot. For example, in the case where the user-selected image includes a photograph of the authorized user and their sister Lisa that was taken while they were on vacation in Tahiti, the authorized user may add an image hotspot either on top of or adjacent to Lisa and this hotspot may include a text annotation that reads "This is my sister Lisa in Tahiti". The image hotspot addition request may also specify a hyperlink to information content that is related to the image hotspot. For example, in the just-described case where the user-selected image includes the just-described photograph and image hotspot, the word "Lisa" in the hotspot's text annotation may be hyperlinked to Lisa's FACEBOOK® (a registered trademark of Facebook, Inc.) Page on the Web, and the word "Tahiti" in the hotspot's text annotation may be hyperlinked to information content that is related to Tahiti such as a conventional search engine results page that is associated with the keyword "Tahiti", or another image that is related to Tahiti (e.g., a map of Tahiti), or a video of Tahiti, among other types of information content related to Tahiti. The image hotspot addition request may also specify the size (e.g., the area) of the image hotspot. The image hotspot addition request may also specify the properties (e.g., the shape, color, size, or the like) of the graphical icon that is used to indicate the presence of each image hotspot on the user-selected image.

As is appreciated in the arts of the Web and digital images, the image hotspots that are added to the user-selected image that is inserted into the personalized third-party webpage can function in a variety of ways when the personalized third-party webpage is viewed by a given user. For example, in a tested implementation of the webpage image personalization technique described herein these image hotspots function in the following manner. When the personalized third-party webpage is first displayed to the user the image hotspots are not visible to the user. Upon the user moving their cursor over the user-selected image, a graphical icon indicating the presence of an image hotspot is displayed on top of the user-selected image for each of the image hotspots. Then, upon the user selecting a given graphical icon, the text annotation associated with the image hotspot corresponding to the graphical icon will be displayed to the user. In the case where this text annotation includes a hyperlink to information content that is related to the image hotspot, upon the user selecting this hyperlink this information content will be displayed to the user.

Given the foregoing, it will be appreciated that the hotspot addition feature of the webpage image personalization technique implementations described herein advantageously enriches the user-selected image with points of interest and information about the details depicted in this image. The hotspot addition feature also advantageously engages each user who views the personalized third-party webpage by allowing them to interact with the user-selected image.

Referring again to FIG. 2, the process for allowing an authorized user to personalize an existing third-party webpage can optionally include the following actions. A Uniform Resource Locator (URL) (e.g., a web address) that uniquely identifies the personalized third-party webpage can be generated (process action 212). Then, upon receiving a request from the authorized user to share the personalized third-party webpage on one or more conventional social networking websites that are specified by the authorized user (process action 214), the generated URL will be shared with these social networking websites (process action 216). Examples of such social networking websites include FACEBOOK® (a registered trademark of Facebook, Inc.) and TWITTER® (a registered trademark of Twitter, Inc.), among many others.

Figure 3:
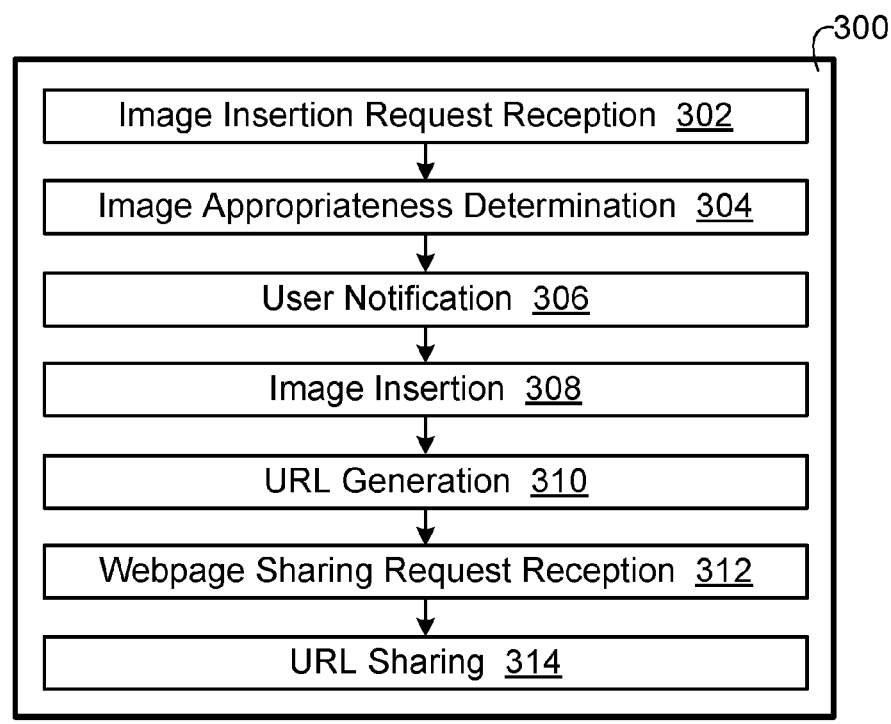
FIG. 3 is a diagram illustrating an exemplary implementation, in simplified form, of a webpage personalizer computer program for allowing an authorized user to personalize an existing third-party webpage.

FIG. 3 illustrates an exemplary implementation, in simplified form, of a webpage personalizer computer program for allowing an authorized user to personalize an existing third-party webpage. As exemplified in FIG. 3 and referring again to FIG. 2, the webpage personalizer computer program 300 includes, but is not limited to, an image insertion request reception sub-program 302 that performs actions 200, 202 and 204, an image appropriateness determination sub-program 304 that performs action 206, a user notification sub-program 306 that performs action 208, an image insertion sub-program 308 that performs action 210, a URL generation sub-program 310 that performs action 212, a webpage sharing request reception sub-program 312 that performs action 214, and a URL sharing sub-program 314 that performs action 216. Each of the just-described sub-programs is realized on a computing device such as that which is described in more detail in the Exemplary Operating Environments section which follows. More particularly and by way of example but not limitation, and referring again to FIG. 1, in an exemplary implementation of the webpage image personalization technique described herein the just-described sub-programs may all be realized on the one or more server computing devices 110/112 upon which the webpage personalizer service 108 operates.

2.0 Other Implementations

While the webpage image personalization technique has been described by specific reference to implementations thereof, it is understood that variations and modifications thereof can be made without departing from the true spirit and scope of the webpage image personalization technique. It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 4:
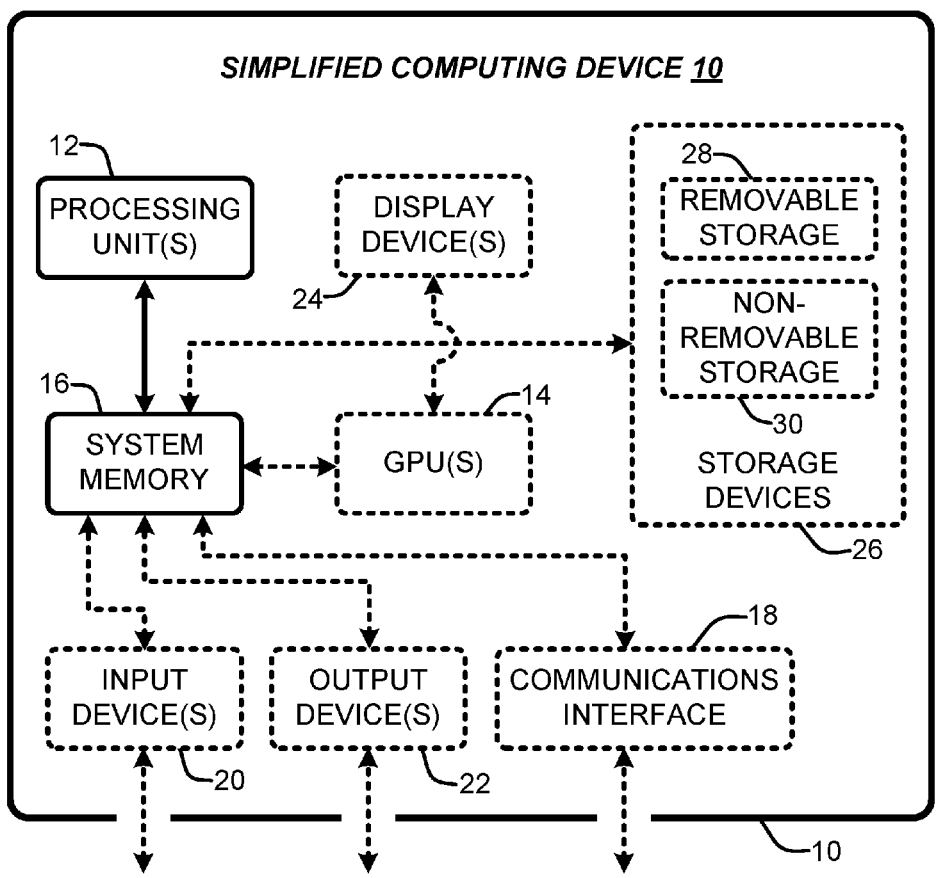
FIG. 4 is a diagram illustrating a simplified example of a general-purpose computer system on which various implementations and elements of the webpage image personalization technique, as described herein, may be realized.

The webpage image personalization technique implementations described herein are operational within numerous types of general purpose or special purpose computing system environments or configurations. FIG. 4 illustrates a simplified example of a general-purpose computer system on which various implementations and elements of the webpage image personalization technique, as described herein, may be implemented. It is noted that any boxes that are represented by broken or dashed lines in the simplified computing device 10 shown in FIG. 4 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the webpage image personalization technique implementations described herein, the device should have a sufficient computational capability and system memory to enable basic computational operations. In particular, the computational capability of the simplified computing device 10 shown in FIG. 4 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the webpage image personalization technique implementations described herein, including input, output, control, feedback, and response to one or more users or other devices or systems associated with the webpage image personalization technique implementations, are enabled by a variety of Natural User Interface (NUI) scenarios. The NUI techniques and scenarios enabled by the webpage image personalization technique implementations include, but are not limited to, interface technologies that allow one or more users user to interact with the webpage image personalization technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the webpage image personalization technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the webpage image personalization technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 4 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various webpage image personalization technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The webpage image personalization technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The webpage image personalization technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation a system is employed for allowing an authorized user to personalize an existing third-party webpage. This system includes a webpage personalizer that includes one or more computing devices, the computing devices being in communication with each other via a computer network whenever there is a plurality of computing devices, and a computer program having a plurality of sub-programs executable by the computing devices, the computing devices being directed by the sub-programs of the computer program to, receive a request from the authorized user to insert a user-selected image into the third-party webpage, determine if the user-selected image is appropriate for use on the third-party webpage, this determination being based on one or more image appropriateness criteria, and whenever the user-selected image is determined to be appropriate for use on the third-party webpage, personalizing the third-party webpage by inserting the user-selected image into the third-party webpage according to this image insertion request.

In one implementation of the just-described system the user-selected image is retrieved from a personalized image repository which includes a collection of images that is contributed to by one or more of the authorized user or one or more other users. In another implementation the user-selected image includes one of: a photograph of one or more of the authorized user or one or more other users; or a photograph taken by the authorized user or another user; or a graphical image generated by the authorized user or another user. In another implementation the user-selected image includes a public image the authorized user or another user downloaded from a website.

In another implementation the sub-program for receiving a request from the authorized user to insert a user-selected image into the third-party webpage includes sub-programs for: receiving a request from the authorized user to add an image hotspot to a specific location on the user-selected image, and overlaying the image hotspot onto the user-selected image in this specific location. In one version of this implementation the image hotspot addition request specifies one or more of: a text annotation providing information about the image hotspot; or a hyperlink to information content that is related to the image hotspot. In another implementation the computing devices are further directed by the sub-programs of the computer program to: generate a Uniform Resource Locator (URL) that uniquely identifies the personalized third-party webpage; receive a request from the authorized user to share the personalized third-party webpage on one or more social networking websites that are specified by the authorized user; and share this URL with these social networking websites. In another implementation the third-party webpage includes the homepage of a web search engine.

In another implementation the image appropriateness criteria include the user-selected image being uncopyrighted. In one version of this implementation the sub-program for determining if the user-selected image is appropriate for use on the third-party webpage includes a sub-program for analyzing the user-selected image to determine if it includes one or more of: a notice of copyright; or information indicating the user-selected image cannot be used without the consent of its owner. In another version of this implementation the user-selected image includes metadata, and the sub-program for determining if the user-selected image is appropriate for use on the third-party webpage includes a sub-program for analyzing this metadata to determine if it includes one or more of: a notice of copyright; or information indicating the user-selected image cannot be used without the consent of its owner.

In another implementation the image appropriateness criteria include the user-selected image being sanctioned as being compatible with a branding associated with the third-party webpage. In another implementation the image appropriateness criteria include the user-selected image having no inappropriate content. In another implementation the image appropriateness criteria include the user-selected image not appearing in a list of images that are not to be used on the third-party webpage. In another implementation the image insertion request specifies that a background image of the third-party webpage be changed from a default image to the user-selected image. In another implementation the image insertion request specifies that the user-selected image be inset into a specific location on the third-party webpage.

The implementations and versions described in any of the previous paragraphs in this section may also be combined with each other, and with one or more of the implementations and versions described prior to this section. For example, some or all of the preceding implementations and versions may be combined with the foregoing implementation where the user-selected image includes one of: a photograph of one or more of the authorized user or one or more other users; or a photograph taken by the authorized user or another user; or a graphical image generated by the authorized user or another user. In addition some or all of the preceding implementations and versions may be combined with the foregoing implementation where the user-selected image includes a public image the authorized user or another user downloaded from a website. In addition some or all of the preceding implementations and versions may be combined with the foregoing implementation where the computing devices are further directed by the sub-programs of the computer program to: generate a Uniform Resource Locator (URL) that uniquely identifies the personalized third-party webpage; receive a request from the authorized user to share the personalized third-party webpage on one or more social networking websites that are specified by the authorized user; and share this URL with these social networking websites.

In addition some or all of the preceding implementations and versions may be combined with the foregoing implementation where the third-party webpage includes the homepage of a web search engine. In addition some or all of the preceding implementations and versions may be combined with the foregoing implementation where the image appropriateness criteria include the user-selected image being uncopyrighted. In addition some or all of the preceding implementations and versions may be combined with the foregoing implementation where the image appropriateness criteria include the user-selected image being sanctioned as being compatible with a branding associated with the third-party webpage. In addition some or all of the preceding implementations and versions may be combined with the foregoing implementation where the image appropriateness criteria include the user-selected image having no inappropriate content. In addition some or all of the preceding implementations and versions may be combined with the foregoing implementation where the image appropriateness criteria include the user-selected image not appearing in a list of images that are not to be used on the third-party webpage.

In another implementation a computer-implemented process is employed for allowing an authorized user to personalize an existing third-party webpage. This process includes the actions of: using one or more computing devices to perform the following process actions, the computing devices being in communication with each other via a computer network whenever a plurality of computing devices is used: receiving a request from the authorized user to insert a user-selected image into the third-party webpage; determining if the user-selected image is appropriate for use on the third-party webpage, this determination being based on one or more image appropriateness criteria; and whenever the user-selected image is determined to be appropriate for use on the third-party webpage, personalizing the third-party webpage by inserting the user-selected image into the third-party webpage according to this image insertion request.

In one implementation of the just-described process the process further includes the actions of: using the computing devices to perform the following process actions: generating a Uniform Resource Locator (URL) that uniquely identifies the personalized third-party webpage; receiving a request from the authorized user to share the personalized third-party webpage on one or more social networking websites that are specified by the authorized user; and sharing this URL with these social networking websites. In another implementation the image appropriateness criteria include one or more of: the user-selected image being uncopyrighted; or the user-selected image being sanctioned as being compatible with a branding associated with the third-party webpage; or the user-selected image having no inappropriate content; or the user-selected image not appearing in a list of images that are not to be used on the third-party webpage.

In another implementation a computer-readable storage medium has computer-executable instructions stored thereon that, responsive to execution by a computing device, cause the computing device to allow an authorized user to personalize an existing third-party webpage, this personalization including: receiving a request from the authorized user to insert a user-selected image into the third-party webpage; determining if the user-selected image is appropriate for use on the third-party webpage, this determination being based on one or more image appropriateness criteria; and whenever the user-selected image is determined to be appropriate for use on the third-party webpage, personalizing the third-party webpage by inserting the user-selected image into the third-party webpage according to this image insertion request.

In another implementation a webpage personalization system is implemented by a means for allowing an authorized user to personalize an existing third-party webpage. The webpage personalization system includes a webpage personalizer that includes one or more computing devices. These computing devices are in communication with each other via a computer network whenever there is a plurality of computing devices. These computing devices include processors configured to execute a first reception step for receiving a request from the authorized user to insert a user-selected image into the third-party webpage, a determination step for determining if the user-selected image is appropriate for use on the third-party webpage, this determination being based on one or more image appropriateness criteria, and whenever the user-selected image is determined to be appropriate for use on the third-party webpage, a personalization step for personalizing the third-party webpage by inserting the user-selected image into the third-party webpage according to this image insertion request.

In one version of the just-described webpage personalization system the first reception step for receiving a request from the authorized user to insert a user-selected image into the third-party webpage includes a second reception step for receiving a request from the authorized user to add an image hotspot to a specific location on the user-selected image, and a hotspot addition step for overlaying the image hotspot onto the user-selected image in this specific location. In another version the processors are further configured to execute a URL generation step for generating a Uniform Resource Locator (URL) that uniquely identifies the personalized third-party webpage; a third reception step for receiving a request from the authorized user to share the personalized third-party webpage on one or more social networking websites that are specified by the authorized user; and a URL sharing step for sharing the generated URL with these social networking websites.

In another version the determination step for determining if the user-selected image is appropriate for use on the third-party webpage includes an image analysis step for analyzing the user-selected image to determine if it includes one or more of: a notice of copyright; or information indicating the user-selected image cannot be used without the consent of its owner. In another version where the user-selected image includes metadata, the determination step for determining if the user-selected image is appropriate for use on the third-party webpage includes a metadata analysis step for analyzing the metadata to determine if it includes one or more of: a notice of copyright; or information indicating the user-selected image cannot be used without the consent of its owner.

Wherefore, what is claimed is:

1. A system for allowing a user to personalize a webpage, comprising:
   a webpage personalizer comprising one or more computing devices, said computing devices being in communication with each other via a computer network whenever there is a plurality of computing devices, and a computer program having a plurality of sub-programs executable by said computing devices, said computing devices being directed by the sub-programs of the computer program to,
   receive a request from a client device of the user to insert a user-selected image into an existing third-party webpage managed by an entity other than the user, the third-party webpage being publicly accessible to client devices over a wide-area network at an initial Uniform Resource Locator that uniquely identifies the third-party webpage, said image insertion request specifying a particular one of a variety of ways that the user-selected image is to be inserted into the third-party webpage,
   determine if the user is authorized to personalize the third-party webpage based on a user identifier, and if the user-selected image is appropriate for use on the third-party webpage, said image appropriateness determination being based on one or more image appropriateness criteria,
   whenever the user is determined to be authorized to personalize the third-party webpage and the user-selected image is determined to be appropriate for use on the third-party webpage, personalize the third-party webpage by inserting the user-selected image into the third-party webpage according to the particular way that is specified in said image insertion request to obtain a personalized version of the third-party webpage, the user being identified by the user identifier for accessing the personalized version of the third-party webpage over the wide-area network at the initial Uniform Resource Locator, and
   generate a version-specific Uniform Resource Locator that uniquely identifies the personalized version of the third-party webpage for sharing access to the personalized version of the third-party webpage.

2. The system of claim 1, wherein the user-selected image is retrieved from a personalized image repository comprising a collection of images that is contributed to by one or more of the user or one or more other users.

3. The system of claim 1, wherein the user-selected image comprises one of:
   a photograph of one or more of the user or one or more other users; or
   a photograph taken by the user or another user; or
   a graphical image generated by the user or another user.

4. The system of claim 1, wherein the user-selected image comprises a public image the user or another user downloaded from a website.

5. The system of claim 1, wherein the sub-program for receiving a request from the user to insert a user-selected image into an existing third-party webpage comprises sub-programs for:
   receiving a request from the user to add an image hotspot to a specific location on the user-selected image, and
   overlaying the image hotspot onto the user-selected image in said specific location.

6. The system of claim 5, wherein said image hotspot addition request specifies one or more of:
   a text annotation providing information about the image hotspot; or
   a hyperlink to information content that is related to the image hotspot.

7. The system of claim 1, wherein said computing devices are further directed by the sub-programs of the computer program to:
   receive a request from the user to share the personalized version of the third-party webpage on one or more social networking websites that are specified by the user; and
   share the version-specific URL with the one or more social networking web sites.

8. The system of claim 1, wherein the third-party webpage comprises the homepage of a web search engine.

9. The system of claim 1, wherein the image appropriateness criteria comprise the user-selected image being uncopyrighted.

10. The system of claim 9, wherein the sub-program for determining if the user is authorized to personalize the third-party webpage, and if the user-selected image is appropriate for use on the third-party webpage comprises a sub-program for analyzing the user-selected image to determine if it comprises one or more of:
    a notice of copyright; or
    information indicating the user-selected image cannot be used without the consent of its owner.

11. The system of claim 9, wherein the user-selected image comprises metadata, and the sub-program for determining if the user is authorized to personalize the third-party webpage, and if the user-selected image is appropriate for use on the third-party webpage comprises a sub-program for analyzing said metadata to determine if it comprises one or more of:
    a notice of copyright; or
    information indicating the user-selected image cannot be used without the consent of its owner.

12. The system of claim 1, wherein the image appropriateness criteria comprise the user-selected image being sanctioned as being compatible with a branding associated with the third-party webpage.

13. The system of claim 1, wherein the image appropriateness criteria comprise the user-selected image having no inappropriate content.

14. The system of claim 1, wherein the image appropriateness criteria comprise the user-selected image not appearing in a list of images that are not to be used on the third-party webpage.

15. The system of claim 1, wherein said image insertion request specifies that a background image of the third-party webpage be changed from a default image to the user-selected image.

16. The system of claim 1, wherein said image insertion request specifies that the user-selected image be inset into a specific location on the third-party webpage.

17. A computer-implemented process for allowing a user to personalize a webpage, the process comprising the actions of:
    using one or more computing devices to perform the following process actions, the computing devices being in communication with each other via a computer network whenever a plurality of computing devices are used:

receiving a request from a client device of the user to insert a user-selected image into an existing third-party webpage managed by an entity other than the user, the third-party webpage being publicly accessible to client devices over a wide-area network at an initial Uniform Resource Locator that uniquely identifies the third-party webpage, said image insertion request specifying a particular one of a variety of ways that the user-selected image is to be inserted into the third-party webpage;

determining if the user is authorized to personalize the third-party webpage based on a user identifier, and if the user-selected image is appropriate for use on the third-party webpage, said image appropriateness determination being based on one or more image appropriateness criteria;

whenever the user is determined to be authorized to personalize the third-party webpage and the user-selected image is determined to be appropriate for use on the third-party webpage, personalizing the third-party webpage by inserting the user-selected image into the third-party webpage according to the particular way that is specified in said image insertion request to obtain a personalized version of the third-party webpage, the user being identified by the user identifier for accessing the personalized version of the third-party webpage over the wide-area network at the initial Uniform Resource Locator; and generating a version-specific Uniform Resource Locator that uniquely identifies the personalized version of the third-party webpage for sharing access to the personalized version of the third-party webpage.

18. The process of claim 17, further comprising the actions of:

using the computing devices to perform the following process actions:

receiving a request from the user to share the personalized version of the third-party webpage on one or more social networking websites that are specified by the user; and sharing the version-specific URL with the social networking websites.

19. The process of claim 17, wherein the image appropriateness criteria comprise one or more of:

the user-selected image being uncopyrighted; or the user-selected image being sanctioned as being compatible with a branding associated with the third-party webpage; or the user-selected image having no inappropriate content; or the user-selected image not appearing in a list of images that are not to be used on the third-party webpage.

20. A computer-readable storage medium having computer-executable instructions stored thereon that, responsive to execution by a computing device, cause the computing device to allow a user to personalize a webpage, said personalization comprising:

receiving a request from a client device of the user to insert a user-selected image into an existing third-party webpage managed by an entity other than the user, the third-party webpage being publicly accessible to client devices over a wide-area network at an initial Uniform Resource Locator that uniquely identifies the third-party webpage, said image insertion request specifying a particular one of a variety of ways that the user-selected image is to be inserted into the third-party webpage;

determining if the user is authorized to personalize the third-party webpage based on a user identifier, and if the user-selected image is appropriate for use on the third-party webpage, said image appropriateness determination being based on one or more image appropriateness criteria;

whenever the user is determined to be authorized to personalize the third-party webpage and the user-selected image is determined to be appropriate for use on the third-party webpage, personalizing the third-party webpage by inserting the user-selected image into the third-party webpage according to the particular way that is specified in said image insertion request to obtain a personalized version of the third-party webpage, the user being identified by the user identifier for accessing the personalized version of the third-party webpage over the wide-area network at the initial Uniform Resource Locator; and generate a version-specific Uniform Resource Locator that uniquely identifies the personalized version of the third-party webpage for sharing access to the personalized version of the third-party webpage.

* * * * *